(12) United States Patent
Lander

(10) Patent No.: US 9,339,021 B2
(45) Date of Patent: May 17, 2016

(54) THERMAL PROCESSING DEVICE, SYSTEM, AND METHOD

(71) Applicant: Kenneth Lander, Eugene, OR (US)

(72) Inventor: Kenneth Lander, Eugene, OR (US)

( * ) Notice: Subject to any disclaimer, the term of this patent is extended or adjusted under 35 U.S.C. 154(b) by 271 days.

(21) Appl. No.: 13/939,584

(22) Filed: Jul. 11, 2013

(65) Prior Publication Data

US 2014/0013653 A1 Jan. 16, 2014

Related U.S. Application Data

(60) Provisional application No. 61/671,550, filed on Jul. 13, 2012.

(51) Int. Cl.
*A01M 1/20* (2006.01)
*F24D 3/00* (2006.01)
*F24D 3/08* (2006.01)
*F24D 3/10* (2006.01)
*A01M 19/00* (2006.01)

(52) U.S. Cl.
CPC ............... *A01M 1/2088* (2013.01); *A01M 1/20* (2013.01); *A01M 1/2094* (2013.01); *A01M 19/00* (2013.01); *F24D 3/00* (2013.01); *F24D 3/08* (2013.01); *F24D 3/10* (2013.01); *F24D 2200/18* (2013.01)

(58) Field of Classification Search
CPC ..... A01M 1/20; A01M 1/2094; A01M 19/00; F24F 3/06; F24F 3/065; F24F 3/08; F24D 3/00; F24D 3/02; F24D 3/10; F24D 2200/18
USPC ..... 43/132.1, 124, 144; 237/8 A, 8 B, 57, 59, 237/61–63, 65, 66; 165/267, 278, 279, 281, 165/287, 288, 298, 52, 66, 132
See application file for complete search history.

(56) References Cited

U.S. PATENT DOCUMENTS

| | | | | | |
|---|---|---|---|---|---|
| 352,908 | A | * | 11/1886 | Barker | F24D 3/00 237/19 |
| 2,348,610 | A | * | 5/1944 | Colby | F24D 3/02 237/63 |
| 2,469,963 | A | * | 5/1949 | Grosjean | F24D 3/14 43/124 |
| 2,539,469 | A | * | 1/1951 | Powers | F24D 3/08 237/62 |
| 2,546,358 | A | * | 3/1951 | Duy | F24D 3/02 237/63 |
| 2,948,516 | A | * | 8/1960 | Martinelli | F28D 19/00 165/104.31 |
| 3,910,236 | A | * | 10/1975 | Merritt, Jr. | F22D 1/12 122/421 |
| 4,106,692 | A | * | 8/1978 | Baier | F24D 3/08 237/63 |
| 4,137,965 | A | * | 2/1979 | Fallon, Jr. | F23L 15/045 122/504.2 |
| 4,139,152 | A | * | 2/1979 | Kronberger, Jr. | F24D 11/005 126/514 |
| 4,173,949 | A | * | 11/1979 | Roethe | F22D 1/12 122/1 C |
| 4,277,021 | A | * | 7/1981 | Daye | F24H 3/088 126/110 R |

(Continued)

*Primary Examiner* — Darren W Ark
(74) *Attorney, Agent, or Firm* — Mohr Intellectual Property Law Solutions, PC

(57) ABSTRACT

In one embodiment, the present invention eradicates pests, such as bedbugs, and toxic mold, for example, among other organisms that invade a dwelling, structure, building, vehicle, or other enclosure. The system includes a burner element having a heat exchanger in contact with the exhaust gas, the heat exchanger on the burner heats a heat transfer fluid (HTF). High pressure HTF flow is used to drive isolation pumps, electrical generators, fans, and other auxiliary equipment. A pressure management system within each heat exchanger ensures optimum flow of HTF. The fluid exchanger is either air-to-fluid or fluid-to-fluid heat exchanger.

6 Claims, 11 Drawing Sheets

(56) References Cited

U.S. PATENT DOCUMENTS

| | | | | |
|---|---|---|---|---|
| 4,296,883 A * | 10/1981 | Yanna | F24D 3/00 | 237/56 |
| 4,318,366 A * | 3/1982 | Tompkins | F22D 1/00 | 122/20 B |
| 4,330,083 A * | 5/1982 | Di Fiore | F24B 1/18 | 126/502 |
| 4,371,111 A * | 2/1983 | Pernosky | F24D 3/02 | 122/20 B |
| 4,372,487 A * | 2/1983 | Hollister | F23C 9/00 | 122/20 B |
| 4,379,447 A * | 4/1983 | Schott | F24D 12/02 | 126/117 |
| 4,380,153 A * | 4/1983 | Ursillo | F01D 1/34 | 126/101 |
| 4,408,716 A * | 10/1983 | Rockwell | F24H 3/02 | 126/110 E |
| 4,529,120 A * | 7/1985 | Fleshman, Jr. | F23N 1/085 | 110/216 |
| 4,601,426 A * | 7/1986 | Brosenius | F24D 11/002 | 237/56 |
| 4,623,093 A * | 11/1986 | Arndt | F24H 9/124 | 237/19 |
| 4,628,869 A * | 12/1986 | Symsek | C21B 9/00 | 122/1 A |
| 4,817,329 A * | 4/1989 | Forbes | A01M 1/2094 | 43/132.1 |
| 4,961,283 A * | 10/1990 | Forbes | A01M 1/2094 | 43/124 |
| 5,305,735 A * | 4/1994 | Welden | F24H 1/107 | 122/31.1 |
| 5,349,778 A * | 9/1994 | Chu | A01M 1/2094 | 43/124 |
| 5,390,660 A * | 2/1995 | Danielson | F24D 3/1058 | 126/271.2 R |
| 5,524,820 A * | 6/1996 | Regan | F24H 1/08 | 122/13.3 |
| 5,775,581 A * | 7/1998 | Welden | F24D 12/02 | 237/56 |
| 5,779,143 A * | 7/1998 | Michaud | F24D 19/1009 | 237/56 |
| 5,799,620 A * | 9/1998 | Cleer, Jr. | F24H 6/00 | 122/31.1 |
| 5,979,781 A * | 11/1999 | Fiedrich | F24D 10/006 | 237/59 |
| 6,199,770 B1 | 3/2001 | King et al. | | |
| 6,327,812 B1 | 12/2001 | Hedman et al. | | |
| 6,612,067 B2 | 9/2003 | Topp | | |
| 7,690,148 B2 | 4/2010 | Hedman | | |
| 7,926,222 B2 * | 4/2011 | Molnar | A01M 1/2094 | 43/124 |
| 8,141,623 B2 * | 3/2012 | Blecker | F24F 3/06 | 165/218 |
| 8,479,439 B2 * | 7/2013 | DeMonte | A01M 1/2094 | 126/110 B |
| 8,479,440 B2 * | 7/2013 | DeMonte | A01M 1/2094 | 126/110 B |
| 8,720,109 B2 * | 5/2014 | O'Brien | A01M 1/2094 | 122/4 A |
| 8,742,296 B2 * | 6/2014 | Bermudez | A47C 31/007 | 165/46 |
| 8,756,857 B2 * | 6/2014 | DeMonte | A01M 1/2094 | 43/132.1 |
| 9,038,389 B2 * | 5/2015 | Palmer | F01K 9/003 | 60/651 |
| 9,101,125 B2 * | 8/2015 | Knote | A01M 1/2094 | |
| 9,226,489 B2 * | 1/2016 | Pattison | A01M 1/2094 | |
| 9,247,725 B2 * | 2/2016 | Hosli | A01M 1/20 | |
| 2001/0004813 A1 * | 6/2001 | Hedman | A01M 1/2094 | 43/132.1 |
| 2005/0246942 A1 * | 11/2005 | Mueller | A01M 1/2094 | 43/124 |
| 2007/0023980 A1 * | 2/2007 | Abaraw | A01M 1/2094 | 266/252 |
| 2007/0084105 A1 * | 4/2007 | Lindsay | A01M 1/2094 | 43/129 |
| 2011/0064605 A1 | 3/2011 | Hedman | | |
| 2012/0151950 A1 * | 6/2012 | Jagusztyn | F28D 7/1684 | 62/228.1 |
| 2012/0216444 A1 * | 8/2012 | Raud | A01M 1/2094 | 43/132.1 |
| 2012/0233907 A1 * | 9/2012 | Pattison | A01M 1/2094 | 43/124 |
| 2013/0056177 A1 * | 3/2013 | Coutu | F28D 19/042 | 165/96 |
| 2013/0263496 A1 * | 10/2013 | Maloney | A01M 1/2094 | 43/114 |
| 2013/0269239 A1 * | 10/2013 | Whitley | A01M 19/00 | 43/132.1 |
| 2015/0052800 A1 * | 2/2015 | Timbrook, Jr. | A01M 1/2094 | 43/132.1 |
| 2015/0128483 A1 * | 5/2015 | Krupp | F24H 3/025 | 43/132.1 |
| 2015/0181856 A1 * | 7/2015 | Mladek | A01M 1/2094 | 43/132.1 |
| 2015/0305320 A1 * | 10/2015 | Hedman | A01M 1/24 | 43/132.1 |

\* cited by examiner

THERMAL PROCESSING DEVICE, SYSTEM, AND METHOD

PRIORITY CLAIM

The present application claims benefit under 35 USC Section 119(e) of U.S. Provisional Patent Application Ser. No. 61/671,550 filed on 2012 Jul. 13: The present application is based on and claims priority from this application, the disclosure of which is hereby expressly incorporated herein by reference.

BACKGROUND

Currently, there is an upswing of bedbug infestations in the United States. Bed bugs seek blood meals from people and pets in their beds at night when the host (person or pet) is asleep. Bed bugs and their eggs can lie dormant for long periods of time, residing in cushions, mattresses, under baseboards, and in most crevices, nooks, and crannies. And, although they are not known to transmit disease, they are extremely hard to eradicate.

Traditionally, long-period chemical saturation of an infested area was the preferred method of eradicating the bedbug. However, some species of the pesky insects have been shown to have developed a resistance to pesticides. For other species, bedbugs can be eliminated using safe chemical treatments, fumigation and vacuuming, but these techniques typically must be repeated to get rid of the infestation because the chemicals only work on living bugs, and not the eggs.

An extermination of a bedbug outbreak must be completely thorough to be effective—if even one female bug survives; the area may become re-infested, as an adult female bedbug lays up to five eggs every day, with each egg taking only seven to 28 days to hatch. Each can lay several hundred eggs over its lifetime.

To make sure that no bedbug-hiding place is overlooked during the often tedious search and destroy missions, some people even hire bedbug-sniffing dogs.

Although experts disagree about the safest way to go about exterminating these pesky insects, the tried and true method is to use chemicals. However, more recently the Environmental Protection Agency of the United States Federal Government, banned the use of an industrial pesticide, Propoxur, which is already being used in commercial buildings, on crops and in pet collars, to fight household infestations of bedbugs and declared it unsafe for residential applications because it poses health risks for children and harms their nervous systems.

Chemical treatments, moreover, are only effective on living adolescent and adult bedbugs—the eggs survive, so effective chemical treatments require multiple visits over long periods of time, as the eggs incubate for 28-days. Thus, for practical time restraint reasons along with chemical-resistant species of bedbugs and human safety concerns, chemical treatments to eradicate bedbugs are disfavored and often ineffective.

More recently, applying heat to an enclosed, infected area has seen success in eradicating bedbugs. All forms of the bug (adult, nymph, and egg) are effectively killed if sustained temperatures of 114-degrees F are achieved for a minimum of 15 minutes. Of course, this requires that the innermost cushion on the sofa, the inner-most portion of the mattress, under base boards and in heating ducts, also reach this desired temperature for the desired time.

The current teaching in the art includes elevating the temperature of an infected enclosed area by using heat exchangers. Ambient air temperature rises as large fans move the volume of air defined by the enclosed area through the heat exchangers. Temperature probes strategically placed in the enclosed area monitor the achieved increase in air temperature and when a desired temperature is reached, a timing device monitors the duration. To provide a hot thermal mass to the heat exchanges, one teaching in the art instructs to provide large portable electric heaters to heat and move the air via fans. Yet another teaching instructs to couple a remotely located furnace to heat a large volume of glycol, which is then pumped to the enclosed area via a feed line and a return line. The current teaching instructs 400 liter/105.66 gallon tanks of glycol be heated to 210-degrees Fahrenheit. Because of the volume of fluid being moved, the current method is limited to a four-story building height. Higher buildings require booster pumps periodically spaced along the lines to move the column of liquid to the exchangers to a maximum of 20 stories.

One representative teaching of chemical-based eradicating systems known in the art includes the pest extermination system of King et al. in U.S. Pat. No. 6,199,770 issued in 2001 Apr. 13. King et al. teaches a piping system giving a plurality of nozzles positioned therealong, the nozzles are adapted for spraying a pesticide. A pumping system delivers the pesticide to the piping system. Limitations of King et al. include the harmful effect to humans of pesticides emitted during eradication and lingering effects thereafter, the cost and complexity of installing the piping system in a structure and/or enclosure, and that the system is very difficult to set up, tear down, and move to a second enclosure after the first enclosure has been eradicated.

One representative teaching of heat-based eradicating systems includes the "Method of Killing Organism and Removal of Toxins in Enclosures" as described by Hedman et al. in U.S. Pat. No. 6,327,812 issued on 2001 Dec. 11. Therein, Hedman et al. teach temperature-sensing probes installed in the enclosure to establish a baseline temperature and a real-time recorder to monitor temperatures as hot air is introduced through one or more ducts to raise the structure temperature to at least about 120-degrees F. This temperature is known to be sufficient to kill essentially all insects, bacteria, virus, dust mites, spiders, silver fish, fungi, and toxic molds. The heated air escapes through existing open doors and windows or through ducts to a filter assembly that captures the remains of the organisms. Hedman et al. claim that a typical building can be treated in six to eight hours.

More specifically, Hedman et al. instruct a system including one or more heaters that heat a gas, preferably air or nitrogen, to the predetermined temperature lethal to the organisms to be destroyed. For a more complete disinfection, the gas temperature is preferably at least about 1550 F., with optimum results generally be achieved with temperatures in the range of about 120 to 300-degrees F. A gas burning heater, such as a conventional propane heater is preferred as being particularly efficient in heating air. The heated gas from one or more heaters is directed to a blower, which directs the hot gas into enclosure through at least one ingress duct and at least one egress duct is provided to allow the gas to leave the structure. One significant limitation of Hedman et al. includes excess waste due to the requirement of heating gas to at least 1550-degrees F to heat a volume of air, and then move that volume of air to the enclosure. This wastes tremendous amount of energy and requires significant gas for heating and the equipment must be very large and cumbersome to move from location to location. Limitations of existing propane heaters include requiring overly large quantities of propane to achieve the desired temperature and they create moisture as a result of burning propane. Most large metro areas ban the use of propane burners as well. Temperature regulation is difficult at best, and oxygen depletion is also a result of burning propane. Placing workers in the oxygen depleted, heated environment is not possible without extra protective equipment.

Another example of a heat-eradicating system includes the "Apparatus for and Method of Eradicating Pests" as disclosed by Topp in U.S. Pat. No. 6,612,067 issued 2003 Sep. 2. Topp teaches an apparatus and system for disinfesting a large number of items by raising the temperatures of wood and wood products to a specified temperature for a specified period of time. The apparatus includes an insulated or non-insulated enclosure having a first end, a second external end, a second interior end, a left wall, a right, a rigid basal structure, a primary floor, a sub-floor, an interior ceiling, an interior sub-ceiling, a means for evenly heating the interior of the enclosure and a means of recirculating the air in the enclosure. One limitation of Topp is that the item being eradicated must fit inside the enclosure. While this approach works well for packed or crated, or palletized items for shipment, it is ill-suited for commercial and residential buildings.

SUMMARY OF THE INVENTION

The present invention overcomes the limitations of the known art and advances and improves the state-of-the art of heat exchanging devices and systems. Specifically, the present invention more rapidly heats an enclosure, uses less fuel, and is more compact and portable when compared to the best practices in the industry, particularly as it relates to a system for killing bedbugs, toxic molds, and similar invasive problems common to commercial and residential buildings, vehicles, and the like. It is the best solution for multi-story buildings.

One advantage of the embodiments of the present invention is a device 10 that is well adapted for use a bedbug eradication system, which outperforms all other systems currently being used. Using the device of the present invention, processing of residences (eradicating bedbugs) can be completed within approximately four (4) hours versus the all-day treatment times offered by competing systems. Further, the device of the present invention is much smaller and highly portable and many times more efficient from the teaching in the art. Further, the device of the present invention uses a fraction of the amount of fuel and energy for heating the same volume of air over that of the state of the art systems. And, the device of the present invention puts out twice the net heat energy than those in the art.

In one contemplated embodiment, the present invention includes a device, system and method for eradicating biological organisms including bedbugs and toxic mold, among other known biological pathogens.

Built-In Safety Components:
Vent on HTF Storage Tank 11
Kirsch vent cap 15 on HTF Storage Tank 11
7 psi safety cap on Boiler System Cooler (C)
Maximum Output Pressure Regulator (E)
Positive Flow Switch (H)
High Limit Snap Switch This system has the benefit of performing as a "Open loop System" that is typically pressurized, but with the added benefits and safety of an open system that is non-pressurized, and typically not efficient. The overflow/air vent and Kirsch vent cap on the Storage Tank as well as the 7 psi safety cap on the Boiler System Cooler will not allow pressurization.

One contemplated embodiment of the present invention includes a method, a device, and a system as shown and described. One method includes a method for eradicating organisms from an enclosed space, the method comprises: providing food-grade Glycol in a open loop pressurized system; providing a 2-stage burner system whereby the spent exhaust gas from stage 1 pass through a multi-plate air-to-fluid exchanger in fluid communication with the open loop pressurized system; providing a Kirsch vented cap in the open loop system and selecting the vented cap to release system pressure at a first pre-determined pressure; providing a thermal mixing block in fluid communication with the open loop pressurized system; providing a positive displacement pump in fluid communication with the open loop pressurized system and adapting the pump to pump the food-grade Glycol to a remote location; providing a fluid-to-air heat exchanger in the remote location and placing the heat exchanger in fluid communication with the open loop pressurized system; heating the enclosed space to a predetermined temperature using the remotely located heat exchanger; and maintaining the predetermined temperature for a predetermined minimum time duration.

This method further includes: providing auxiliary fan units in the remote location to increase airflow inside the enclosed space.

This method further includes: providing a first inner-diameter sized hose to supply glycol to the remote fluid-to-air heat exchanger and providing a second inner-diameter sized hose to return the fluid from the heat-exchanger whereby the first inner-diameter is smaller than the second inner-diameter and whereby the first and second hoses are in fluid communication with the open-loop, but acting like a closed-loop, pressurized system. The smaller diameter line that feeds the heat exchanger creates a pressurized fluid that has an affective higher boiling point of the HTF, allowing for a higher temperature HTF to be delivered to the heat-exchanger, which improves operating efficiency and more effectively eradicates the mold or pests.

One contemplated system of the present invention includes a system for eradicating organisms in an enclosed space, the system comprising: a tank adapted to contain a volume of food-grade Glycol (a fluid); a positive displacement pump in fluid communication with the tank and adapted to pump a predetermined volume over time amount of the Glycol; a mixing block in fluid communication with the pump and adapted to receive the fluid at a first preset pressure and volume; a burner unit in fluid communication with the mixing block and adapted to receive the fluid, the burner unit comprising a first stage and a second stage and wherein the second stage comprises a scavenger unit comprising a fluid-to-air heat exchanger arranged on top of an exhaust of the first stage whereby hot exhaust gas from the first stage heats a fluid in the second stage; a first diameter hose in fluid communication with the burner unit; at least one remotely placed air-to-fluid heat exchanger adapted to receive the fluid from the first diameter hose; a second diameter hose in fluid communication with the at least one remotely placed air-to-fluid heat exchanger, the second diameter hose comprising an inner diameter greater than a corresponding inner diameter of the first diameter hose; a filter assembly in fluid communication with the second diameter hose; and a cooler in fluid communication with the remotely placed air-to-fluid heat exchanger, the cooler comprising an air/vapor purge line adapted to prevent air locking, a short dwell return line in fluid communication with the tank, a long dwell return line in fluid communication with the mixing block, and a warm return line in fluid communication with the burner unit.

DRAWING

Figure 1:
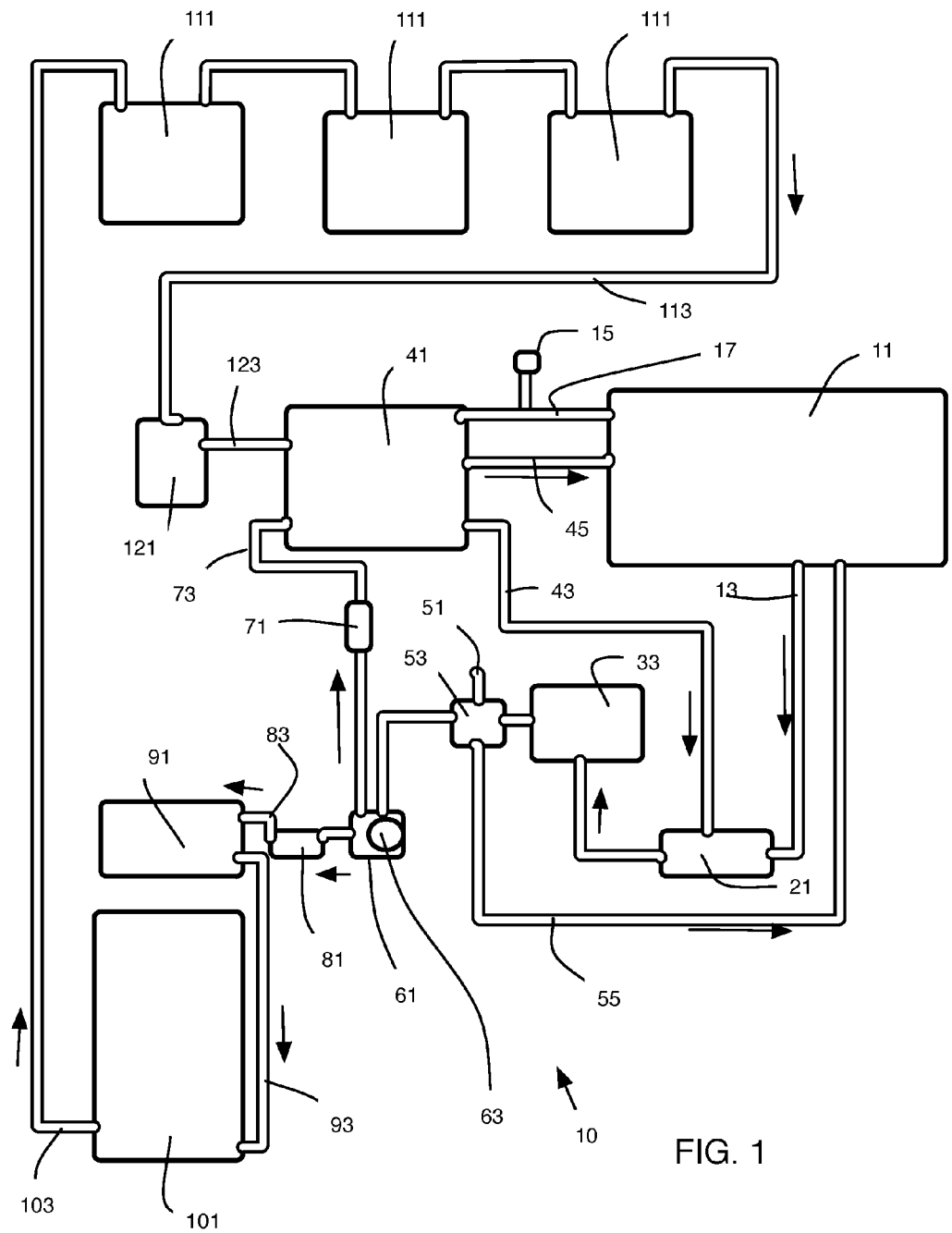
FIG. 1 is a schematic diagram of one embodiment according to the present invention.
Figure 2:
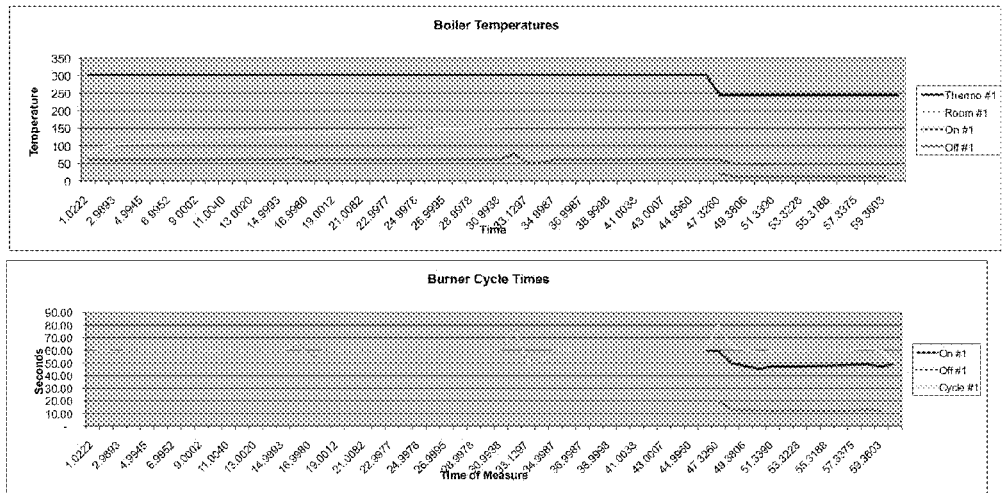
FIG. 2 is a partial list of components of a system according to one embodiment of the present invention.
Figure 3:
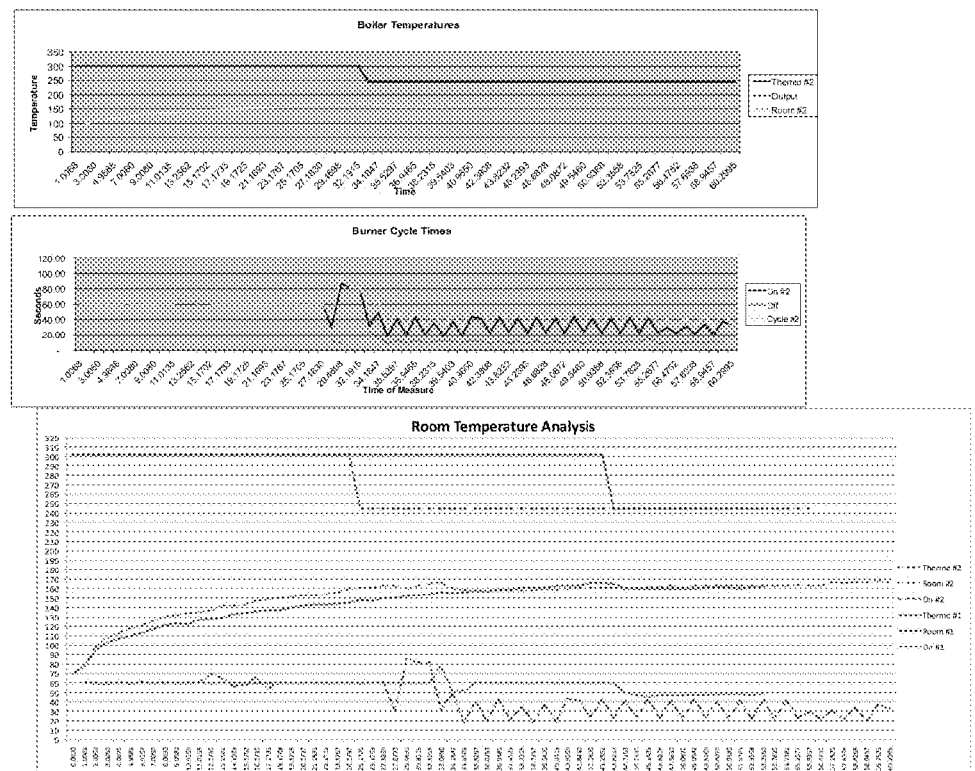
FIG. 3 is another partial list of components of a system according to another embodiment of the present invention.
Figure 4:
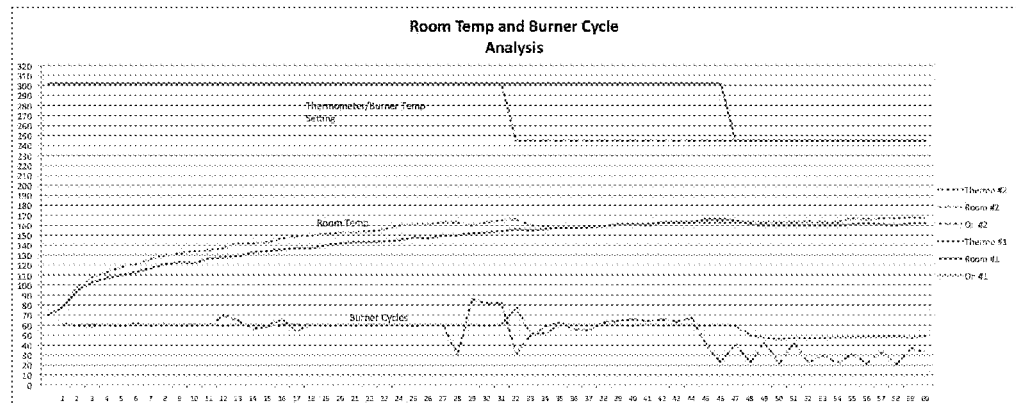
FIG. 4 is a data chart illustrating the relationship of burner temperature to enclosure temperature over time using a system of the present invention.
Figure 4A:
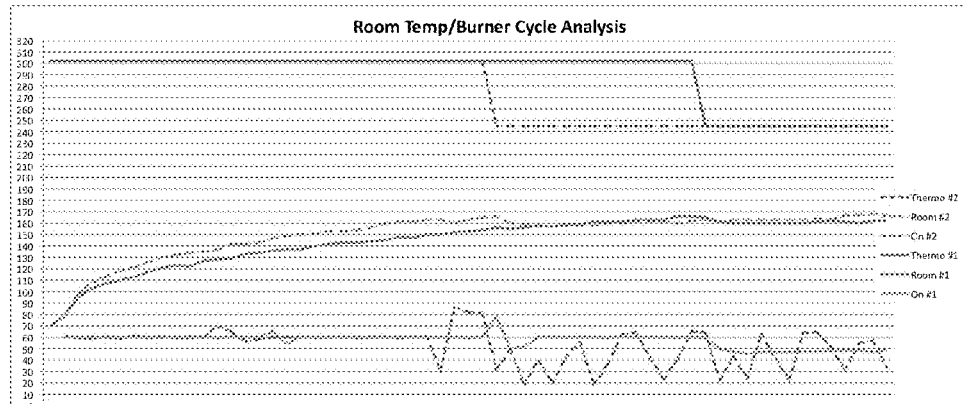
FIG. 4A is another data chart illustrating the relationship of burner temperature to enclosure temperature over time using a system of the present invention.
Figure 5:
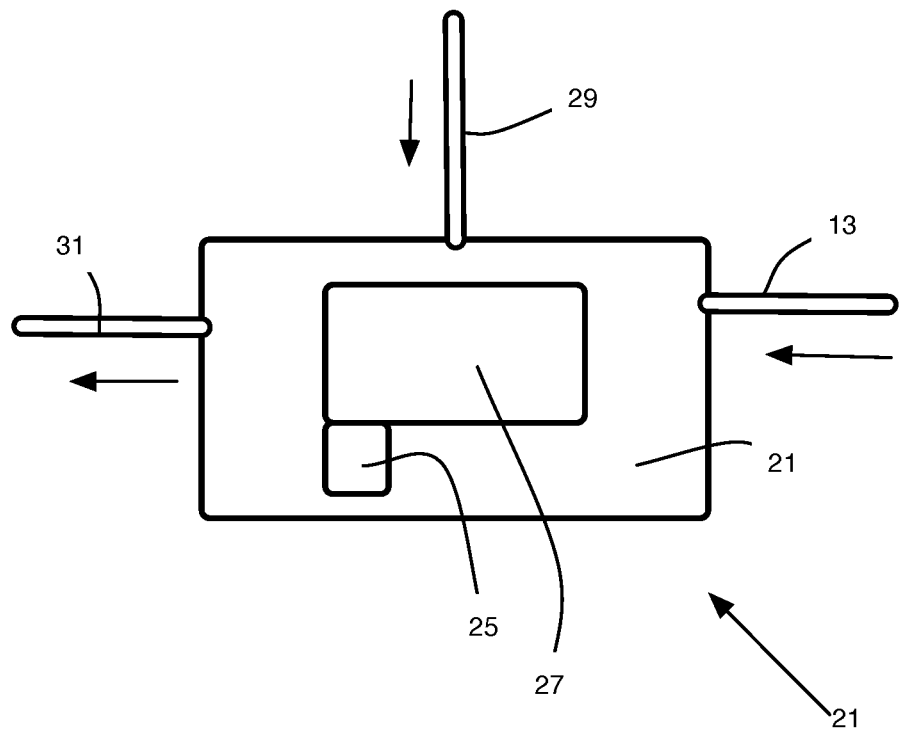
FIG. 5 is a schematic diagram of a mixing block according to one embodiment of the present invention.
Figure 6:
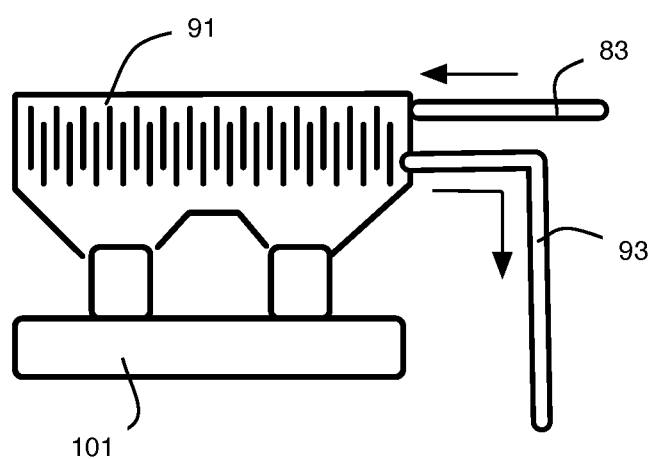
FIG. 6 is a schematic diagram of a scavenger according to one embodiment of the present invention.
Figure 7:
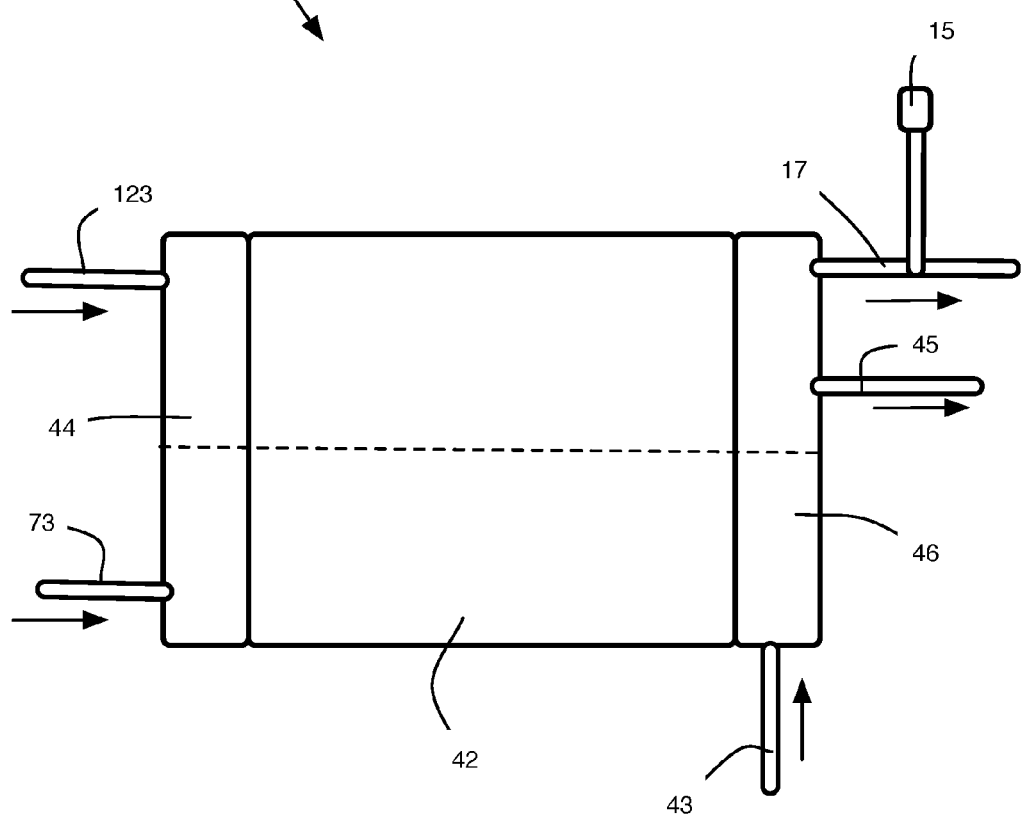
FIG. 7 is a schematic diagram of a system cooler according to one embodiment of the present invention.
Figure 8:
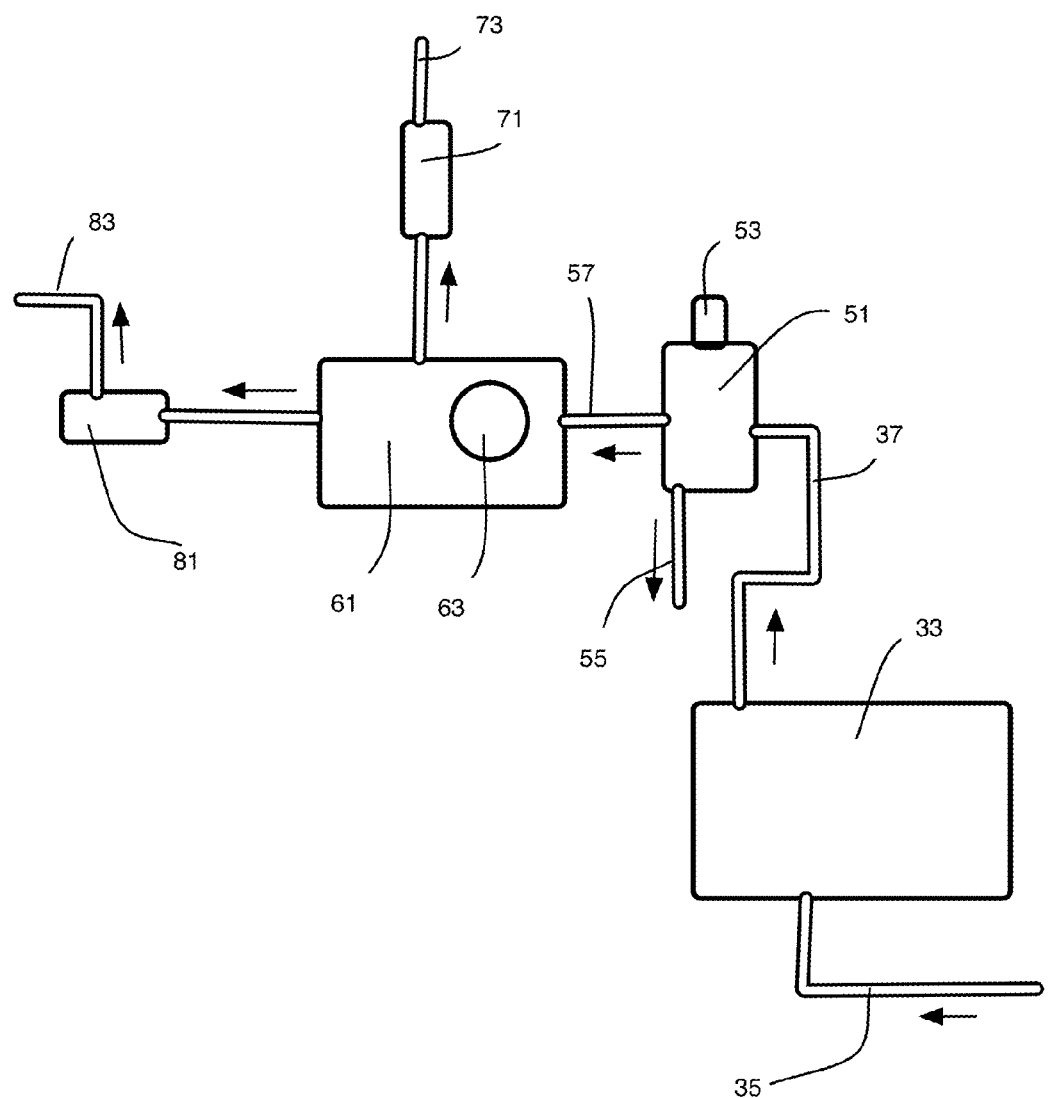
FIG. 8 is temperature and flow control diagram of one embodiment of the present invention.
Figure 9:
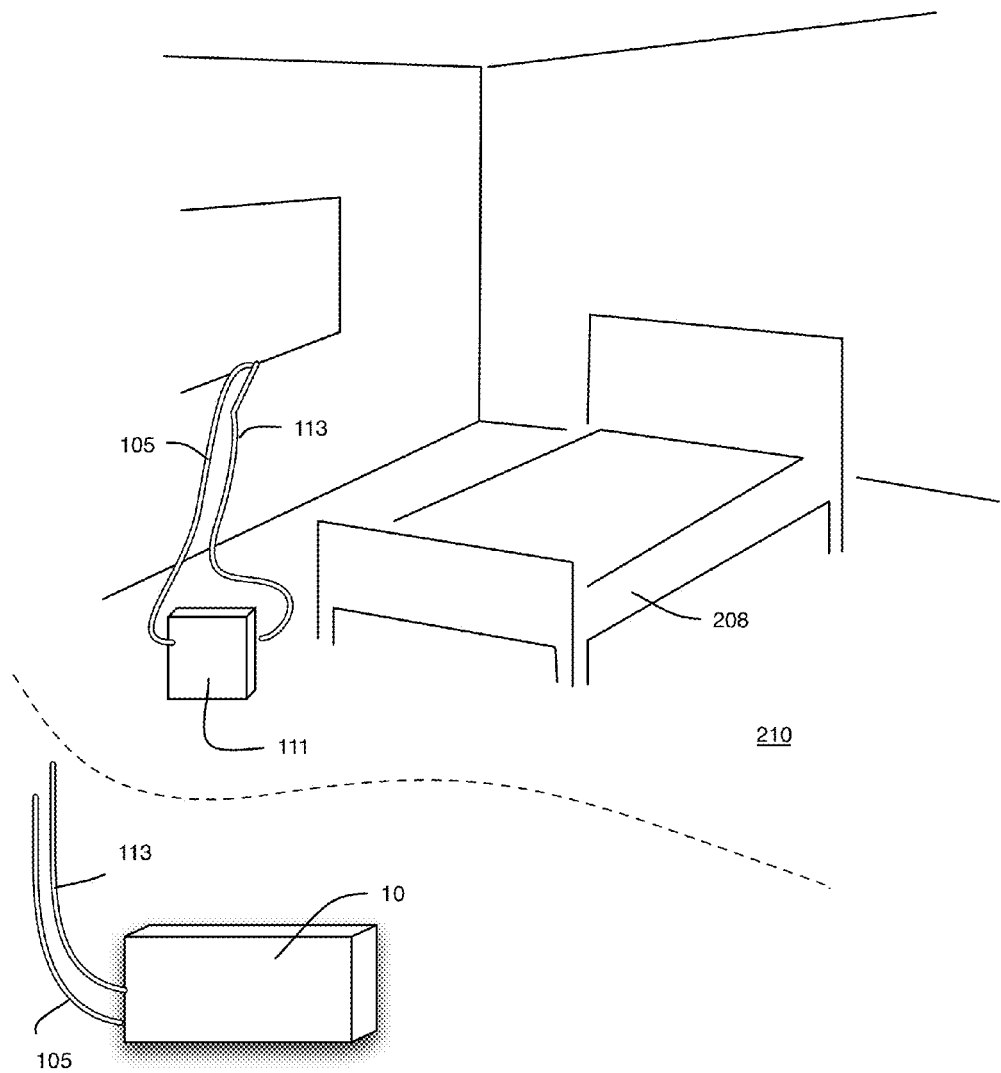
FIG. 9 is a representation of one possible environment of use for the device, system, and method according to the present invention.
Figure 10:
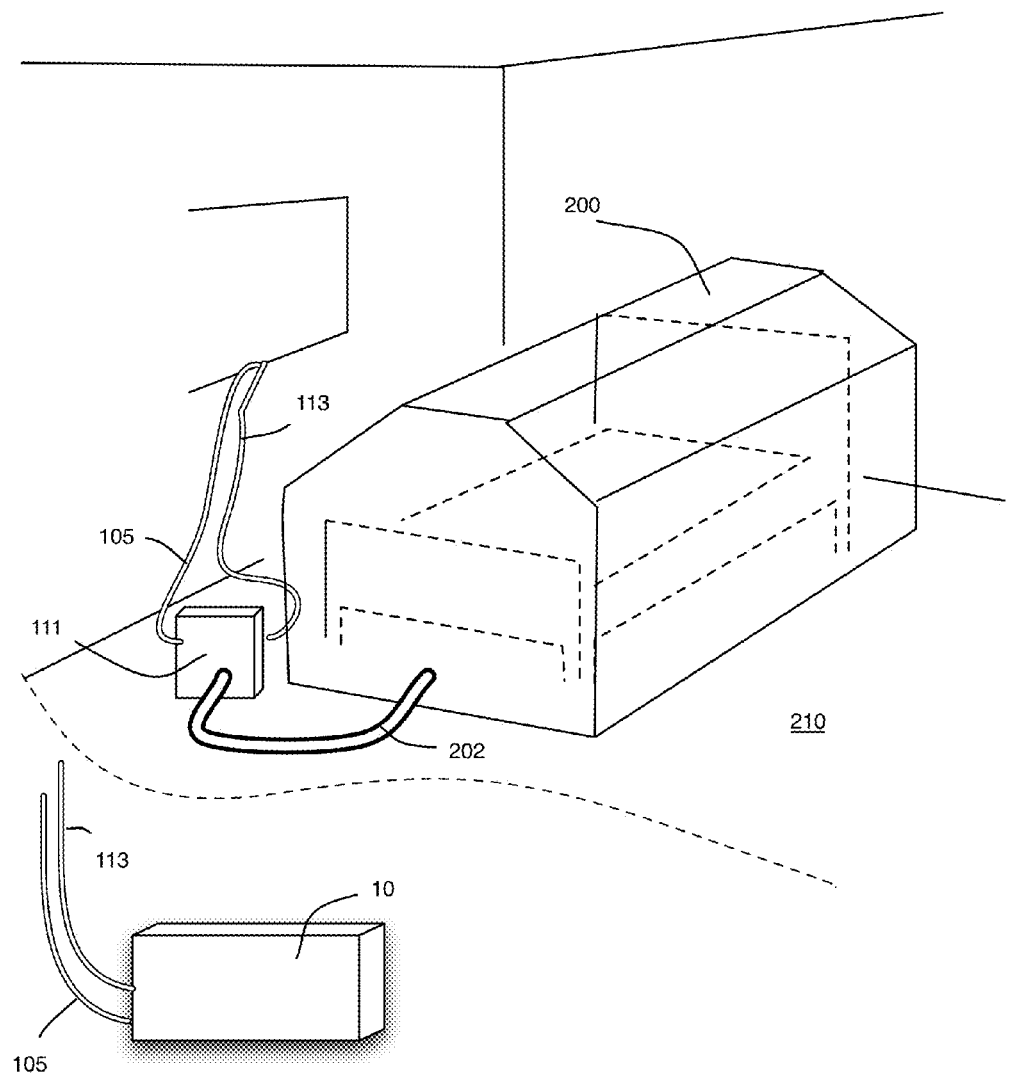

FIG. 10 includes additional components for the system of FIG. 9.

Figure 11:
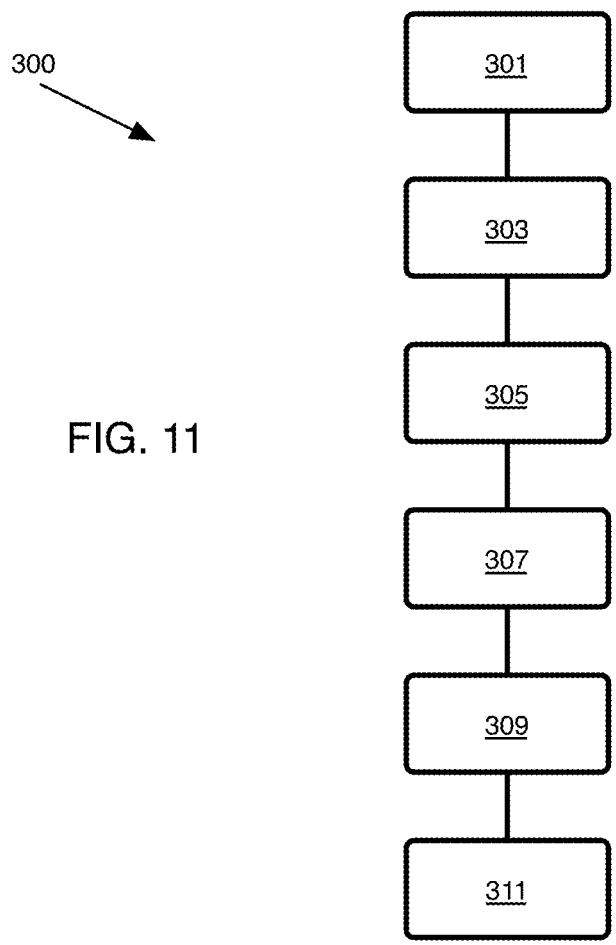

FIG. 11 is a block diagram illustrating a preferred method according to the present invention.

DESCRIPTION OF THE INVENTION

Possible embodiments will now be described with reference to the drawings and those skilled in the art will understand that alternative configurations and combinations of components may be substituted without subtracting from the invention. Also, in some figures certain components are omitted to more clearly illustrate the invention.

One contemplated and proven embodiment of the system according to the present invention is a heat exchanging device 10 well suited for eradicating bedbugs and toxic mold and other similar organisms in residential, commercial, and industrial buildings, vehicles, containers, and any enclosure imaginable. This system includes the parts lists as disclosed in Figures y-z, and more specifically:

A Burner Unit 101 consisting of at least one, but preferably, two (2) stages: Stage 1 is the diesel, natural gas, CNG, or propane-powered burner unit—in one contemplated embodiment uses a smaller burner unit, termed the "10 Series Unit", which produces 169,000 BTU, and in a second contemplated embodiment a larger burner unit, termed "20 Series Unit" produces 294,000 BTU, and in both embodiments the respective contemplated burner units are rated at a continuous 3,000+PSI. One suitable burner unit is manufactured by Mi™ Corporation. Burner units can use diesel, natural gas, CNG, or propane, for example.

A System Cooler 41. The function of the System Cooler is to enable air flow through the system itself, which assists in keeping the components cool. It cools the Heat Transfer Fluid ("HTF") after it returns from the treatment area in preparation for the Positive Displacement Pump. This is the first step in getting the HTF to the 160° threshold required for pump longevity. The System Cooler removes any existing air bubbles in the HTF, keeping the pressure system in balance. The System Cooler also acts as a pressure relief from the Active Flow Control Management Valve. The system cooler typically operates between 0 and 4 PSI, and has a safety pressure relief at 7 PSI.

"The Scavenger 1" (ref. no. 91) ($2^{nd}$ Stage of the Burner). The purpose of the Scavenger 1 is to reclaim the heat normally lost through the burner exhaust to reduce energy consumption and increase efficiency. The Heat Transfer Fluid (HTF) flow comes from the pump, through the Scavenger as a pre-heat, then into the burner for final heating prior to being sent to the exchangers in the treatment area. This pre-heat reduces the amount of fuel needed to heat the HTF to output temperature. It also reduces the temperature of the exhaust, making the exhaust components safe to touch and lowering the environmental impact. It also reduces emissions from the $1^{st}$ stage burner exhaust.

"The Scavenger 2". This component operates the same as Scavenger 1, except instead of removing heat from the burner exhaust; it transfers the heat from the returning fluid prior going to the filtration and cooling loop.

A Positive Displacement Pump System. One contemplated pump system utilizes plungers or pistons, for example ceramic plungers or pistons. Positive displacement pumps are used exclusively in the contemplated systems of the present invention. This results in a higher, more consistent pressure throughout the system. Like a syringe, it precisely measures the fluid and delivers a constant flow, whether at ground level or 50 stories without the need of adding booster pumps. It also allows precise gauging of the required heat energy to deliver optimal performance. The pumps used are rated to deliver up to 3000 psi continuously.

Direct Heat Deployment 111 (coined "Hyper-Thermal Delivery" a trade name) enables rapid heat delivery. This proven embodiment of the present invention has an average delivery time from burner outlet to target area of about 7/10 of a second, allowing no time for thermal loss, thus resulting in uncompromised efficiency.

Glycol Cleansing System 121. This system cools and filters the glycol HTF each time it returns from the treatment area, prior to flowing through the burner for re-heating. The 5-micron filter system extends the life of the Glycol and removes contaminants, which maintains the heat transfer efficiency.

Hose Size Differential. The contemplated system incorporates a 5/16" ID hoses to send the HTF to the treatment area. For the return hoses, the system includes ½" ID hoses, utilizing gravity to assist in the reduction of energy needed to run the positive displacement pump. From this it may be appreciated that the system, once in a continuous run mode, requires reduced energy to pump the fluid as the relatively high pressure, narrow feeder hoses, combined with the larger diameter return hoses uses gravity to create a siphon. Further, the aforementioned positive displacement pump precisely controls fluid volume through the burner section. As a result this embodiment is extremely fuel frugal.

ACS Control Process—the Advanced Control System (ACS) allows each unit to operate individually or cooperatively when linked together whether wirelessly or via a network cable, for example with CAT5 cable. The ACS monitors temperatures in the treatment area and adjusts the burner unit accordingly.

Hot-Tech brand and Fleet-Heat brand heat exchangers: Contemplated embodiments of the present invention utilize fluid-to-fluid heat exchangers. Available configurations will include Base models that are a simple passive Fluid to Fluid exchanger that is suitable for heating engine oil or the antifreeze of heavy machinery or other fleet vehicles in extreme cold environments. The units are also available with an internal pump that is driven from the fluid energy from the HOT-TECH brand main burner unit. This pump circulates the fluid (oil or antifreeze) within the vehicle for the most effective heating or thawing. The units are also available with a built in Dynamo or alternator. Like the aforementioned fluid pump, it too is driven from the fluid energy of the connected main burner unit. The purpose of this is to allow the simultaneous charging of the target Machinery or vehicle's battery system, or run fan units or other electrical device without requiring an outside electric source. This will keep the internal battery temperature up and keep the battery charged and capable of delivering the required cranking amps to start in extremely cold environments.

These units are installed in the machine or vehicle engine compartment, and connection is made utilizing the same self-sealing quick connectors used throughout the HOT-TECH brand systems.

Bed and Furniture Treatment Canopies 200, see FIGS. 9 and 10, for example: These canopies 200 are made from woven fabric, which does not allow much airflow through the weave. They are designed to envelope beds and couches with an inflow tube/vent to concentrate heated air and force it to penetrate through the mattress and box-spring. Beds and couches are the items in each dwelling that require the longest "bake" time in order to kill bed bugs and eggs. With these canopies, the furniture can be treated separately while the room or ambient air is being heated to kill temperature. This will reduce the amount of fuel necessary to run the burner on the machine. We will also design an energy efficient electric blower/heater so the canopies can be sold as a standalone treatment option.

Baseboard (Cove) Treatment System (not pictured in the drawing)—this system, ideally constructed from a heat-resistant plastic material, includes a 90° extrusion that envelopes the baseboards in residences. The design will allow heated air to be forced through a "tunnel", concentrating the heat in another bed bug preferred hiding place. Baseboards are cold spots in residences that require longer exposure to heat in order to achieve kill temperature.

Sprinkler Head Cooling System—One of the current problems confronting Pest Management Companies are the fire suppression systems installed in public facilities. The fire suppression systems are typically set to activate between 135° and 155°. Our sprinkler head coolers are designed to keep the sprinkler heads cool. This dome shaped insulated core is constructed of copper tubing surrounded by aluminum and insulating felt. There is an orifice through which a temperature probe is inserted to monitor the internal temp of the air surrounding the sprinkler head. Chilled Food Grade Glycol is circulated through the copper tubing and out to a cooler/dehumidifier which further insulates and protects the sprinkler head assembly.

HTF Thermal Mixing Block. This is an aluminum mixing-block with a temperature sensor and temperature valve which mixes the hot HTF coming from the holding tank with the cooler HTF from the unit system cooler as needed to achieve a constant 160-degree F HTF temperature to the pump. The maximum 160-degree Fahrenheit temperature is mandatory to maintain the 10-year (or longer) life expectancy on the pump.

Series Circuit vs Parallel Circuit. The various systems and subsystems can be configured in series or in parallel.

Thermal Management System. A closed-loop feed back system monitors and adjusts the equipment based on sensors and logic controls strategically placed throughout the system and subsystems. Those having ordinary skill in the art will understand how such systems would work and the details of which are not presented herein in the interest of brevity.

The Mixing Block. The function of the Mixing Block is to achieve a constant HTF temperature of 160° prior to entry into the Positive Displacement Pump. The primary draw is from the lower portion of the HTF storage tank. The HTF temperature in this portion of the tank is a lower temperature than that from the top portion. In lower chamber of the Mixing Block is a temperature sensor, connected to a temperature valve in the upper portion, which controls HTF flow through. The outflow is limited to a maximum of 160°, flowing to the Positive Displacement Pump. If the temperature of the HTF is at or below 160°, the HTF will flow straight through the Mixing Block. If the temperature is above 160°, the valve on the top portion of the Mixing Block opens, allowing cooler HTF from the System Cooler to mix with the hotter HTF, cooling it down to 160°. The HTF then flows to the Positive Displacement Pump.

The applications for the systems and devices of the present invention are numerous. Some contemplated applications include the eradication of bedbugs, cockroaches, rodents, lice, mites, termites, fleas, ticks, ants, and other similar organisms. This system also is extremely affective in killing toxic mold, other molds, mildew, and similar organism. Further, the rapid, economical heat producing affect of the present invention can be applied to non-lethal environments, such as providing emergency heat to temporary structures, provided hot water for field showers. The compact size and efficient use of fuel also means that the present invention is well suited for disaster relief efforts —providing hot air and hot water to field tents constructed to house, feed, and care for the displaced and wounded—whether from natural disaster or war.

One particular use of the present invention includes detoxifying toxic mold infested FEMA mobile home trailers, emergency heating and cooling, mobile heating and cooling, sterilization of rooms, ER, operating theaters, etc., drying out structures after floods, plumbing freeze breaks, etc., sterilization of airplanes, including air handling system and ducts, potable water generation, water purification, hot water pressure washers, emergency utilities generation, electrical generation, hot and cold running water creation and distribution, thawing and heating in extreme cold climates, heating for construction sites, outdoor weddings, parties and festivities, etc., providing utilities to portable medical facilities, emergency showers with water purification, pest control in overseas containers as well as trailers, mold remediation—toxic and non-toxic, pest extermination—ants, spiders, fleas, roaches, etc., for example.

The device 10 and heat-exchange system of the present invention utilizes direct heat deployment. This eliminates the need to heat and store large quantities of HTF (heat transfer fluid—here glycol) as opposed to other systems taught in the art. Further, the present invention utilizes "food grade" Propylene Glycol as the HTF which is non toxic and non hazardous to the environment if spilled. In addition, the electronic components of the present invention run on a standard household outlet and draw about the same amount of electricity as a household vacuum, thus greatly improving the energy efficiency over the known art.

Another component of the present invention is a unique 2-stage burner system whereby the spent exhaust gases from stage 1 pass through a multi-plate air-to-fluid exchanger both reducing the exhaust temperature and gathering the free (previously wasted) energy to preheat the HTF prior to entering the primary stage. The exhaust temperature is reduced from 400° F. without the 2nd stage to 121-129° F. with the 2nd stage. This also has the benefit of reducing fuel consumption by 30% and reducing the likelihood of injuries to the operator due to hot exhaust components.

Making reference to FIGS. 1 and 5-8, a Heat Transfer Fluid (HTF) (for example, as used in preferred embodiments of the present invention, a food-grade Glycol mixture) leaves the HTF Storage Tank 11 via hose connection 13. The HTF Storage Tank 11 has a Kirsch vented cap 15 as well as a vent/overflow orifice 17 to prevent building pressure. The HTF then enters HTF Thermal Mixing Block 21 via connection 13. In the lower chamber of the Thermal Mixing Block 21 is a temperature sensor 25, connected to a temperature valve 27 in the upper portion, which controls HTF flow through outlet valve 29. The output 31 is stabilized to a continuous 160-degrees Fahrenheit, flowing to the Positive Displacement Pump 33 through outlet 37. If the temperature is in excess of 160-degrees F in the tank 11, a valve 29 on outlet 43 opens, allowing the flow of cool/cold HTF from the System Cooler 41 through the long dwell return line 43.

When the HTF enters the pump 33 through 35, it becomes pressurized and is measured to an exact pre-set volume. The HTF exits the pump via outlet 37 and enters the Maximum Output Pressure Regulator 51 that is sized to each specific system. If the pressure or flow is in excess of the preset maximum, valve 53 opens, allowing a bleed-off of the HTF, which is then returned back to the storage tank 11 via line 55. If pressure is within acceptable limits, the HTF flows through into the Pressure/Flow Management Manifold 61 where the user/pressure interface occurs. A gauge 63 indicates to the operator the actual outgoing/lift pressure from the unit. The unit pressure is a product of head pressure plus high velocity fluid flow and the back-pressure associated to drag through couplers, etc.

Due to the piston and/or plunger design of a positive displacement pump at a predetermined RPM, a precise and exact measurement of fluid flow can be obtained regardless of head pressure. This also allows the system to be unique in that it delivers a constant volume, whether on the ground floor (0' of head) or on the $20^{th}$ to $50^{th}$ floor, etc. with 200-feet to 500-feet of head or more. This is the first instance of a positive displacement pump in this context, as the existing art does not contemplate, or teaches away from this technology in this context.

Attached to the Pressure/Flow Management Manifold 61 is the Active Flow Control Management Valve 71 disposed on line 73. This valve (a hydraulic needle valve) allows for manual adjustment to the HTF flow and pressure, which varies for each treatment job. For instance, a ground level treatment requires less unit pressure than a 20- or 50-floor application. The Active Flow Control Management Valve 71 allows for uninhibited HTF flow (via line 73 through the System Cooler 41) or for the bleed-off of HTF to adjust back-pressure, temperature, and flow. It allows for the control of not just lift pressure, but also allows the operator to reduce the flow rate of the HTF thereby increasing the dwell time in the burner coils to increase thermal absorption and output temperature of the HTF to maximize efficiency.

Also attached to the Pressure/Flow Management Manifold 61 is the Positive Flow Switch 81. This switch is a safety component. The Flow Switch 81 will not allow the burner to operate if there is less than 1.5 gpm flow. If any one of three events occurs, the burner will not operate. These events are: 1) Less than 1.5 gpm flow; 2) Temperature setting on boiler regulator has been achieved; 3) The High Limit Snap Switch is tripped.

The HTF then flows from the Positive Flow Switch 81 into the Scavenger 91 ($2^{nd}$ Stage of the burner), if equipped, via line 83. Inbound HTF traveling in line 83 is at (precisely) 160-degrees F, outbound HTF via line 93 is about 185- to about 200-degrees F, collecting the heat from the Burner exhaust which measures about 350-degrees F to about 780-degrees F or more. Exhaust temperature exiting the Scavenger ($2^{nd}$ stage of the burner) are reduced to about 121-degrees F to about 129-degrees F. The outbound pre-heated HTF then enters Burner stage one chamber 101 for final heating via heating chamber 101, exiting the burner via line 103.

After exiting the Burner 101, the HTF is pumped to the in-room Heat Exchanger Cores 111 via Hyper-Thermal Delivery (fluid to air heat exchanger). An average delivery time from exiting burner stage 101 to a $10^{th}$ floor is an average of $7/10^{th}$ of a second. Maximum HTF pressure upon entering exchanger core 111 is 300 psi. Manual override is achieved via the Active Flow Control Management Valve 71. The in-room Heat Exchanger Cores 111 are daisy chained together via inlet and outlet openings in a series of three, in this example, however other combinations are also contemplated. The small system is capable of expansion up to nine Exchanger Cores (111), with the capability for more on the larger systems. Each of the Exchanger Cores (111) is equipped with an HTF bypass that allows the HTF to skip over an individual Exchanger Core (111) that is regulated by a temperature valve. This bypass valve opens when the HTF on the individual Exchanger Core reaches a preset temperature, allowing the subsequent Exchanger Cores to reach the desired preset temperature at a more rapid rate. As the HTF flows through each Exchanger Core the pressure and temperature is reduced. The device and systems of the present invention also employ the use of differential hose sizing for the following purposes: a smaller (i.e. 5/16" ID) hose can be used for deployment to the first exchanger core. This increases the velocity of the HTF, which allows no time for thermal loss between the boiler and the utilization/treatment area. The system then switches to a larger hose (i.e. ½" ID) to reduce backpressure between exchangers and finally returns. This also reduces energy requirements in multi-story buildings due to the fact that the weight of the returning fluid in the large diameter hose is twice as heavy as the ascending fluid. This uses gravity to create a siphon effect, which greatly reduces the load on the pump motor to create the energy savings.

The HTF is now returned to the Boiler Unit. It is pumped through the Glycol Cleaning Unit 121 via line 113. The Glycol Cleaning Unit removes contaminants of 5-Microns or larger.

The HTF then exits the Glycol Cleaning Unit and enters the System Cooler 41, via an inlet from line 123. This unique system cooler, by design, has a short dwell 44 and long dwell cooling area 46, thus creating the thermal deferential required by thermal mixing block 21. The upper area of the cooler tank 42 is called the Short Dwell 44 area, and after a Short Dwell, the fluid exits the System Cooler tank 41 via a dedicated line 45 and is returned to the HTF Holding Tank 11 via another line. The lower area of the System Cooler tank 42 (the long dwell area 46) stores HTF for a longer period of time for use in thermal balance control as referenced in the Thermal Mixing Block 21 narration above.

With specific reference to FIGS. 9 and 10, the present invention contemplates a system for eradicating organisms from an enclosed space 210, such as a hotel room having furniture including at least a bed 208. This system includes at least one canopy 200 adapted to receive a volume of heated air; a device 10 comprising a supply of HTF enclosed in a storage tank, the storage tank in fluid communication with a thermal mixing block, adapted to mix the HTF to a pre-determined temperature using a warm supply line in fluid communication with a system cooler, a scavenger adapted to receive the pre-determined temperature HTF from the thermal mixing block at a pre-determined pressure, the pre-determined pressure being attained by a pressure regulation means, a burner unit comprising a first burner chamber adapted to heat the HTF received from the scavenger to a second pre-determined temperature, and at least one air-to-fluid heat exchanger 111 adapted to receive the HTF from the burner unit and return the fluid to the system cooler; and wherein the device is further adapted to couple to the canopy and deliver the volume of heated air.

The canopy 200 includes a portal coupled to a large-volume, flexible, air-handling conduit 202 that couples to an adaptor on the heat exchanger 111. This adaptor includes also a forced-air fan unit to drive hot air into an enclosed space defined by the canopy 200. HTF flows from the device 10, which may be located external to the enclosed space 210 via flow line 105, and returns the HTF to the storage tank via line 113.

This system further includes a pressure regulation means comprising a positive displacement pump in fluid communication with the thermal mixing block, adapted to receive the pre-determined temperature HTF therefrom and pump the HTF to a pressure regulator valve having an overpressure return line in fluid communication with the storage tank and further, the pressure regulator valve in fluid communication with a pressure/flow management manifold, the pressure/flow management manifold having an over-pressure/over-temperature return line to the system cooler and further delivering the HTF to the scavenger. This was previously disclosed in reference to FIGS. 1 and 5-8, for example.

This system also includes a scavenger, which further includes an air-to-fluid heat exchanger arranged over an exhaust of the first burner chamber; an inlet line adapted to receive the HTF, the inlet line providing HTF to the air-to-fluid heat exchanger whereby exhaust of the first burner heats the HTF; a return line in fluid communication with the air-to-fluid heat exchanger whereby the heated HTF is directed to the first burner. This was previously disclosed in reference to FIGS. 1 and 5-8, for example.

This system further includes a first chamber for mixing HTF; a hot return line in fluid communication with the at least one air-to-fluid heat exchanger, the hot return line coupled to the first chamber; a over pressure over temperature line coupled to the first chamber, the over pressure over temperature line in fluid communication with the pressure regulation means; a cooling chamber in fluid communication with the first chamber; and a second chamber in fluid communication with the cooling chamber, the second chamber coupled to an overpressure escape line having a relief valve, a short dwell return line in fluid communication with the storage tank, and a long-dwell return line in fluid communication with the thermal mixing block, as was previously disclosed in reference to FIGS. 1 and 5-8, for example.

With specific reference to FIG. 11, a preferred method according to the present invention includes a method 300 for eradicating organisms from an enclosed space. This method comprises providing device 301 comprising a supply of HTF enclosed in a storage tank, the storage tank in fluid communication with a thermal mixing block, adapted to mix the HTF to a pre-determined temperature using a warm supply line in fluid communication with a system cooler, a scavenger adapted to receive the pre-determined temperature HTF from the thermal mixing block at a pre-determined pressure, the pre-determined pressure being attained by a pressure regulation means, a burner unit comprising a first burner chamber adapted to heat the HTF received from the scavenger to a second pre-determined temperature, and at least one air-to-fluid heat exchanger adapted to receive the HTF from the burner unit and return the fluid to the system cooler; placing the at least one air-to-fluid heat exchanger inside a closed space 303; operating the device to provide heated HTF to the air-to-fluid heat exchanger for a pre-determined time 305; and monitoring temperature in the closed space for the pre-determined time 307.

Additionally, this method also includes providing at least one canopy 309 adapted to receive a volume of heated air; and placing the canopy over an item of interest within the closed space 311.

Although the invention has been particularly shown and described with reference to certain embodiments, it will be understood by those skilled in the art that various changes in form and detail may be made without departing from the spirit and scope of the invention.

I claim:

1. A device for eradicating organisms from an enclosed space, the device comprising:
 a supply of HTF enclosed in a storage tank, the storage tank in fluid communication with
 a thermal mixing block, adapted to mix the HTF to a pre-determined temperature using a warm supply line in fluid communication with a system cooler;
 a scavenger adapted to receive the pre-determined temperature HTF from the thermal mixing block at a pre-determined pressure, the pre-determined pressure being attained by a first pressure regulator device;
 a burner unit comprising a first burner chamber adapted to heat the HTF received from the scavenger to a second pre-determined temperature;
and at least one fluid-to-air heat exchanger adapted to receive the HTF from the burner unit and return the HTF to the system cooler; and
 wherein the first pressure regulator device comprises
 a positive displacement pump in fluid communication with the thermal mixing block, adapted to receive the pre-determined temperature HTF therefrom and pump the HTF to a pressure regulator valve having an overpressure return line in fluid communication with the storage tank and further, the pressure regulator valve in fluid communication with a pressure/flow management manifold having an over-pressure/over-temperature return line to the system cooler and the pressure/flow management manifold being in fluid communication with the scavenger so as to allow delivery of the HTF to the scavenger.

2. The device of claim 1 wherein the scavenger further comprises:
 an air-to-fluid heat exchanger arranged over an exhaust of the first burner chamber;
 an inlet line adapted to receive the HTF, the inlet line providing the HTF to the air-to-fluid heat exchanger whereby exhaust of the first burner heats the HTF;
 a return line in fluid communication with the air-to-fluid heat exchanger whereby the heated HTF is directed to the first burner.

3. The system of claim 1 wherein the system cooler further comprises:
 a first chamber for mixing the HTF;
 a hot return line in fluid communication with the at least one fluid-to-air heat exchanger, the hot return line coupled to the first chamber;
 the over-pressure/over-temperature return line coupled to the first chamber, the over-pressure/over-temperature return line in fluid communication with the first pressure regulator device;
 a cooling chamber in fluid communication with the first chamber; and
 a second chamber in fluid communication with the cooling chamber, the second chamber coupled to an overpressure escape line having a vented cap, a short dwell return line in fluid communication with the storage tank, and wherein the warm supply line comprises a long-dwell return line in fluid communication with the thermal mixing block.

4. A system for eradicating organisms from an enclosed space, the system comprising:
  at least one canopy adapted to receive a volume of heated air;
  a device comprising a supply of HTF enclosed in a storage tank, the storage tank in fluid communication with thermal mixing block, adapted to mix the HTF to a pre-determined temperature using a warm supply line in fluid communication with a system cooler, a scavenger adapted to receive the pre-determined HTF from the thermal mixing block at a pre-determined pressure, the pre-determined pressure being attained by a pressure regulation means, a burner unit comprising a first burner chamber adapted to heat the HTF received from the scavenger to a second-predetermined temperature, and at least one fluid-to-air heat exchanger adapted to receive the HTF from the burner unit and return the HTF to the system cooler;
  and wherein the device is further adapted to couple to the at least one canopy and deliver the volume of heated air; and
  wherein the pressure regulation means comprises
    a positive displacement pump in fluid communication with the thermal mixing block, adapted to receive the pre-determined temperature HTF therefrom and pump the HTF to a pressure regulator valve having an overpressure return line in fluid communication with the storage tank and further, the pressure regulator valve in fluid communication with a pressure/flow management manifold and the pressure/flow management manifold being in fluid communication with the scavenger so as to allow delivery of the HTF to the scavenger.

5. The system of claim 4 wherein the scavenger further comprises:
  an air-to-fluid heat exchanger arranged over an exhaust of the first burner chamber;
  an inlet line adapted to receive the HTF, the inlet line providing the HTF to the air-to-fluid heat exchanger whereby exhaust of the first burner heats the HTF;
  a return line in fluid communication with the air-to-fluid heat exchanger whereby the heated HTF is directed to the first burner.

6. The system of claim 4 wherein the system cooler further comprises:
  a first chamber for mixing the HTF;
  a hot return line in fluid communication with the at least one fluid-to-air heat exchanger, the hot return line coupled to the first chamber;
  the over pressure return line coupled to the first chamber, the over pressure return line in fluid communication with the pressure regulation means;
  a cooling chamber in fluid communication with the first chamber; and
  a second chamber in fluid communication with the cooling chamber, the second chamber coupled to an overpressure escape line having a vented cap, a short dwell return line in fluid communication with the storage tank, and wherein the warm supply line comprises a long-dwell return line in fluid communication with the thermal mixing block.

* * * * *